United States Patent
Mayhew et al.

(10) Patent No.: US 6,894,452 B2
(45) Date of Patent: May 17, 2005

(54) SYSTEM AND METHOD FOR CONFIGURABLE MOTOR CONTROLLER SETTINGS

(75) Inventors: Scott Mayhew, North Aurora, IL (US);
Scott Wakefield, Plano, IL (US);
Daniel Zuzuly, Geneva, IL (US);
Gregg Jonsson, Batavia, IL (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 165 days.

(21) Appl. No.: 10/252,327

(22) Filed: Sep. 23, 2002

(65) Prior Publication Data
US 2004/0056611 A1 Mar. 25, 2004

(51) Int. Cl.[7] ............................................... G05B 19/18
(52) U.S. Cl. ....................... 318/569; 318/600; 318/778; 318/782; 318/798; 318/801
(58) Field of Search ................................ 318/778–783, 318/798–803, 806–811, 569, 600

(56) References Cited

U.S. PATENT DOCUMENTS

| | | | | |
|---|---|---|---|---|
| 4,301,542 A | * | 11/1981 | Weintraub et al. | 455/353 |
| 4,852,680 A | * | 8/1989 | Brown et al. | 180/287 |
| 5,206,572 A | | 4/1993 | Farag et al. | 318/778 |
| 5,285,375 A | * | 2/1994 | Kim | 700/1 |
| 5,481,171 A | * | 1/1996 | Woginrich, Jr. | 318/778 |
| 5,543,698 A | * | 8/1996 | Tao et al. | 318/611 |
| 6,127,941 A | * | 10/2000 | Van Ryzin | 340/825.69 |
| 6,144,183 A | | 11/2000 | Kawai | 318/675 |

OTHER PUBLICATIONS

Altivar 66 AC Drives "Enclosed AC Drives Motor Control Centers"; Feb. 1898 (Feb. 1989); Square D Company, Schneider Electric S.A., East Knightdale, NC USA; XP002265058; pp. 2–154.

A66SM "Installation and Programming Manual"; Feb. 22, 1999; Niobrara Research and Development Corporation, Joplin, MO USA; pp. 2–15.

Schneider Electric's Altivar 66 AC "Drive has Wide Horsepower Range and Provides Energy Savings, Improves Process Control"; XP002265060; Contact: Louise Jones, Canada 416-752-8652 X3406; p. 2.

\* cited by examiner

*Primary Examiner*—Rina Duda (57) ABSTRACT

A configurable motor controller includes solid state switches for connection between an AC line and motor terminals for controlling application of AC power to the motor. A control circuit controls operation of the solid state switches. The control circuit comprises a programmed processor for commanding operation of the solid state switches. A memory is connected to the programmed processor storing configuration information relating to operation of the solid state switches. A user configuration device selects the values for the stored configuration information. The configuration information comprises adjustable values within a range. The configuration device is adapted to select any adjustable value within the range.

23 Claims, 11 Drawing Sheets

SYSTEM AND METHOD FOR CONFIGURABLE MOTOR CONTROLLER SETTINGS

CROSS REFERENCE TO RELATED PATENT APPLICATIONS

The present U.S. Patent Application having at least one common inventor as

U.S. patent application Ser. No. 10/252,618 entitled "System and Method for Monitoring Currents and for Providing Motor Protection", and U.S. patent application Ser. No. 10/252,326 entitled "System and Method for Configuring a Starter with an External Device"

U.S. patent application Ser. No. 10/252,635 entitled "System and Method for Individual Phase Motor Over Voltage Protection", and U.S. patent application Ser. No. 10/252,637 entitled "System and Method for Automatic Current Limit Control", and are filed with the U.S. Patent and Trademark Office concurrently on Sep. 23, 2002, the entirety of each being incorporated herein by reference.

FIELD OF THE INVENTION

This invention relates to a motor controller and more particularly, a system and method for configuring motor controller settings.

BACKGROUND OF THE INVENTION

Solid state starters/controllers have found widespread use for controlling application of power to an AC induction motor. The conventional starter/controller, referred to hereinafter as simply a controller, uses solid state switches for controlling application of AC line voltage to the motor. The switches may be thyristors such as silicon controlled rectifiers (SCRs) or triacs.

Conventional controllers include a housing enclosing the solid state switches and a control circuit for controlling operation of the solid state switches. For configuring controller operation the motor controller may include digital selectors switches or the like for setting functions and ranges. Indicator lights, such as LEDs, may be used for status indication.

With such a conventional controller there are a limited number of parameters that are user adjustable. For example, the user could select starting current limit, overload current, line rotation and enable or disable the use of off delay. However, adjustment of any of these parameters was limited. For example, with starting current limit, the user could select from among a plurality of discrete values within a range. This enabled the user to make course adjustment to a value such as starting current limit. However, if the user desired to select a different value then one of the preselect discrete values in the range, or if the user wanted to modify other configuration parameters, then custom software or circuitry must be used to satisfy these desires.

The present invention is directed to improvements in configuring motor controllers.

SUMMARY OF THE INVENTION

In accordance with the invention, there is provided a system and method for configuring motor controller settings.

Broadly, there is disclosed in accordance with one aspect of the invention a method of configuring a motor controller comprising providing the motor controller to include solid state switches for connection between an AC line and motor terminals for controlling application of AC power to the motor, and a control circuit for controlling operation of the solid state switches, the control circuit comprising a programmed processor for commanding operation of the solid state switches, and a memory connected to the programmed processor storing configuration information relating to operation of the solid state switches; providing a user configuration device for selecting values for the stored configuration information, the configuration information consisting of either discrete values or adjustable values within a range, the configuration device being adapted to select any adjustable value within the range; and using the configuration device to update the stored configuration information using the selected parameters.

It is a feature of the invention that the adjustable values are selected from starting current limit, overload current, on delay, off delay, current imbalance trip level, and current imbalance disable level.

It is another feature of the invention that providing a configuration device comprises providing a remote configuration device using a wireless interface.

It is a further feature of the invention that providing a configuration device comprises providing a keypad connected to the programmed processor.

It is still a further feature of the invention that selecting any adjustable value within the range comprises selecting any value between an upper limit and a lower limit.

It is yet another feature of the invention that the user configuration device enables a user to configure starting current limit, overload current, line rotation, off delay, on delay, average or individual winding overload protection, current imbalance trip level, and current imbalance disable level.

There is disclosed in accordance with another aspect of the invention a configurable motor controller including solid state switches for connection between an AC line and motor terminals for controlling application of AC power to the motor. A control circuit controls operation of the solid state switches. The control circuit comprises a programmed processor for commanding operation of the solid state switches. A memory is connected to the programmed processor storing configuration information relating to operation of the solid state switches. A user configuration device selects the values for the stored configuration information. The configuration information comprises adjustable values within a range. The configuration device is adapted to select any adjustable value within the range.

There is disclosed in accordance with yet another aspect of the invention a configurable motor controller comprising a housing. Solid state switches are in the housing for connection between an AC line and motor terminals for controlling application of AC power to the motor. A control circuit in the housing controls operations of the solid state switches. The control circuit comprises a programmed processor for commanding operation of the solid state switches and a memory connected to the programmed processor storing configuration information relating to operation of the solid state switches. The user configuration device selects values for the stored configuration information. The configuration information consists of discrete values and adjustable values within a range. The configuration device is adapted to select any adjustable value within the range.

Further features and advantages of the invention will be readily apparent from the specification and from the drawings.

DETAILED DESCRIPTION OF THE INVENTION

Figure 1:
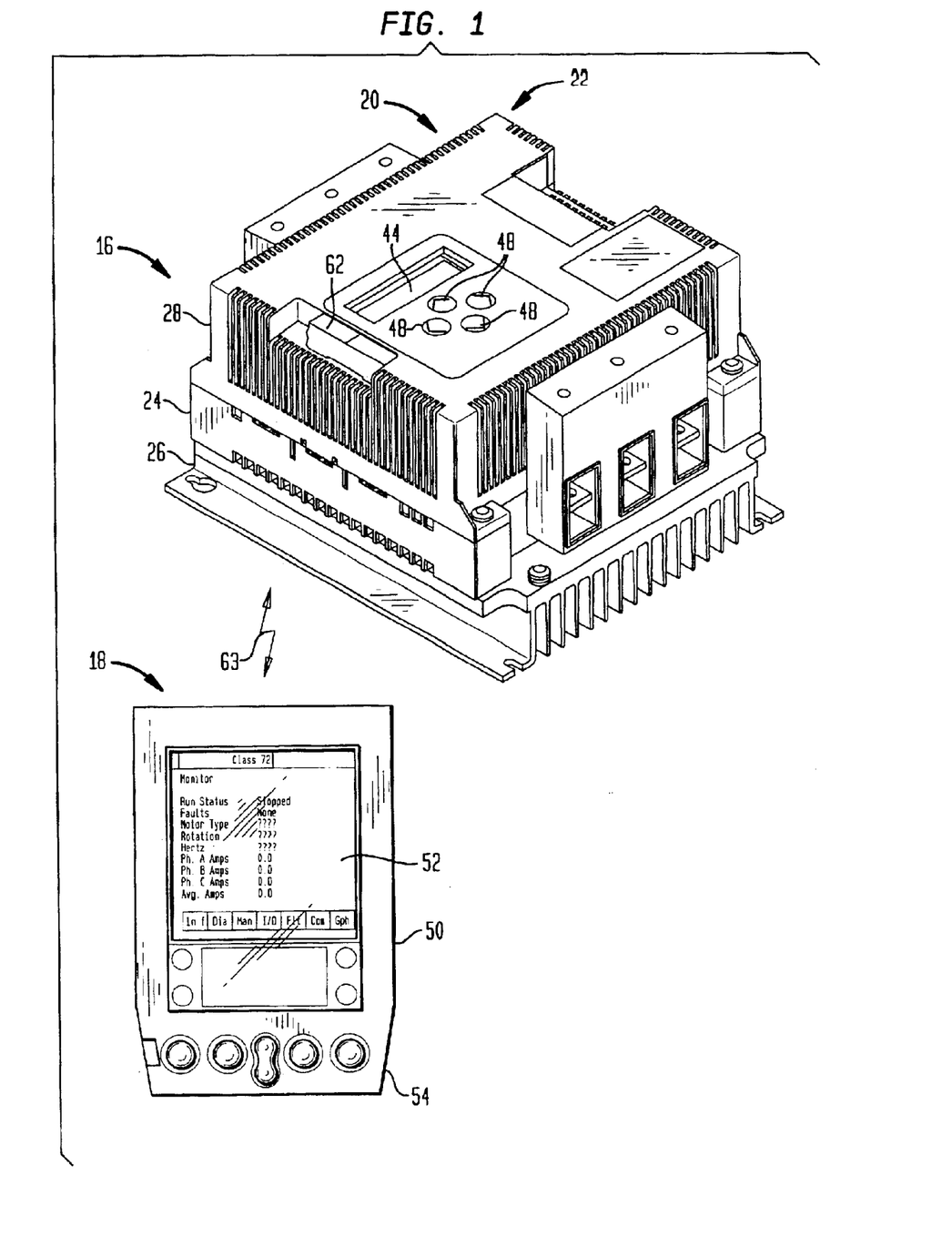
FIG. 1 is a perspective view of a configurable motor controller system in accordance with the invention.

Referring initially to FIG. 1, a user configurable motor controller system 16 in accordance with the invention is illustrated. The user configurable motor controller system 16 includes a remote configuration device 18 and a solid state starter/controller 20, referred to hereinafter as simply a starter or controller.

The motor controller 20 comprises a housing 22 including a housing base 24, a heat sink 26 and a cover 28. The motor controller 20 includes a plurality of solid state switches 32 in the form of thyristors, such as back to back connected silicon controlled rectifier (SCR) pairs, see FIG. 2. For simplicity herein, the SCR pairs 32 are referred to as simply SCRs. Triacs could also be used. The SCRs 32 control application of three phase AC line voltage to a three phase motor. As is apparent, a different number of SCRs 32 could be used to control different numbers of phases, as is apparent to those skilled in the art.

Figure 2:
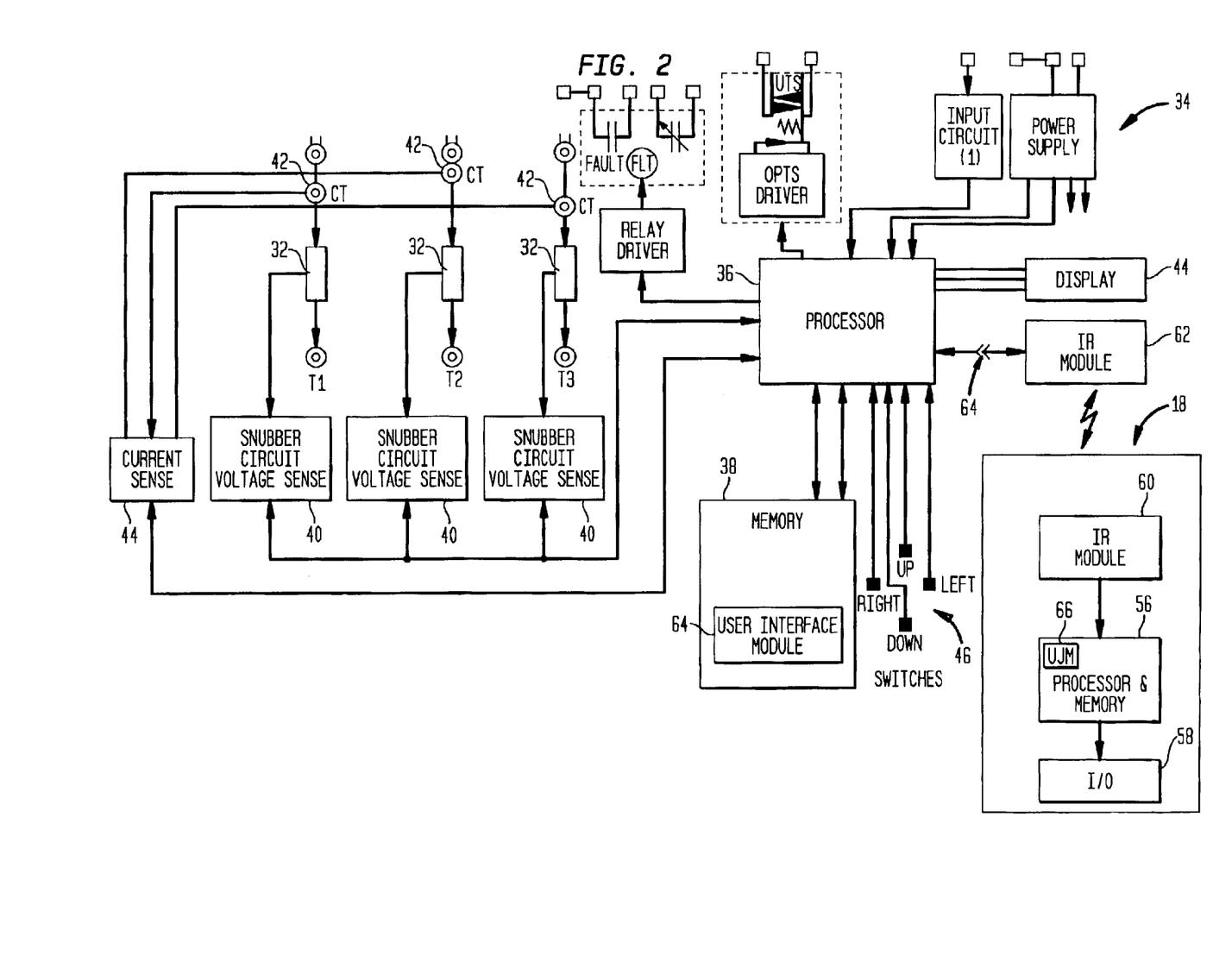
FIG. 2 is a block diagram of the motor controller system of FIG. 1.

The SCRs 32 are mounted to the heat sink 26 within the housing 20. Referring also to FIG. 2, a control circuit 34 is also enclosed in the housing 20. The control circuit 34 controls operation of the SCRs 32. Particularly, the control circuit 34 includes a programmed processor 36, such as a digital signal processor, for commanding operation of the SCRs 32. A memory 38 is connected to the processor 36 and stores configuration information relating to operation of the solid state switches, as described below.

The processor 36 is connected to three interface circuits 40 each for connection to one of the SCRs 32. Particularly, the interface circuits 40 comprise snubber circuits for driving the SCRs 32 and voltage sense circuits for sensing voltage across the SCRs 32. A current transformer 42 senses current of each of the SCRs 32 and is connected to a current sense circuit 44. Other types of current sensors could also be used. The current sense circuit 44 is also connected to the processor 36.

An LCD display 44 on the cover 22, see FIG. 1, is connected to the processor 36. The display 44 is used to indicate configuration settings, operating values, fault conditions, and the like. User actuable switches 46 are electrically connected to the processor 36. The user actuable switches 46 are actuated by actuator elements 48 on the housing cover 22, see FIG. 1, that form a keypad 49. Particularly, the keypad 49 operates the switches 46 for locally selecting parameters for stored configuration information.

In accordance with the invention, the motor controller system 16 is adapted for enhanced user configuration either locally using the keypad 49 or with an external device in the form of the remote configuration device 18. Particularly, in the illustrated embodiment of the invention, the remote configuration device 18 comprises a personal digital assistant (PDA). The PDA 18 includes a housing 50 supporting a display 52 and having user input devices in the form of push buttons 54. The construction of the PDA 18 is conventional in nature and does not form part of the invention. Instead, the invention relates to use of the PDA 18 as an external device for configuring operation of the motor controller 20.

Referring also to FIG. 2, the PDA 18 includes a processor and memory 56, an input/output (I/O) block 58 and an infrared (IR) module 60. The I/O block 58 consists of the display 52 and push buttons 54. The IR module 60 comprises an infrared communication module being a standard element on commercially available PDAs.

In accordance with the invention, an infrared module 62 is mounted to the motor controller cover 22 and is electrically connected to the processor 36 via a connector 64. The IR module 62 allows communications with the PDA 18 via a wireless communication path 63. The infrared module 62 provides necessary voltage isolation with the PDA 18.

The present invention is described utilizing a PDA 18 with infrared communication. As is apparent, an external device in the form of laptop computer or the like using infrared communication could likewise be used. Alternatively, an external device could be hard wired to the connector 64 for configuration. While the illustrated embodiment of the invention shows a wireless interface using infrared communications, other forms of wireless interface could be used as will be apparent to those skilled in the art.

In accordance with the invention, the motor controller system 16 includes a local user interface in the form of the keypad 49 having push buttons 48 and display 44 on the housing 22 for updating stored configuration information in the memory 38. Alternatively, a remote user interface is provided in the form of the external counter remote configuration device 18 for selecting parameters for the stored configuration information.

As is conventional, the processor 36 operates in accordance with various programs stored in the memory 38 to control the SCRs 32. In accordance with the invention, the software programs include a configuration module 64. The configuration module 64 comprises a routine for updating configuration information such as functions and ranges as well as diagnostic information, and the like, as described below. The configuration module 64 stores operational parameters and operating values which are accessible via the local interface or the remote interface. Particularly, under normal operation, the local interface is used. If a remote configuration device is positioned in proximity to the motor controller 20, then the software configuration module 64 alternatively uses the remote interface I/O block 58 for configuration. However, as will be appreciated, the PDA 18 having a larger display 52 may be configured to display more detailed information than would the local display 44. To do this the PDA processor and memory 56 must also include software in the form of a user interface module 66 to operate with the motor controller user interface module 64. The PDA user interface module 66 is essentially a routine for displaying information from the motor controller 20 and transmitting input information to the motor controller 20.

Figure 3:
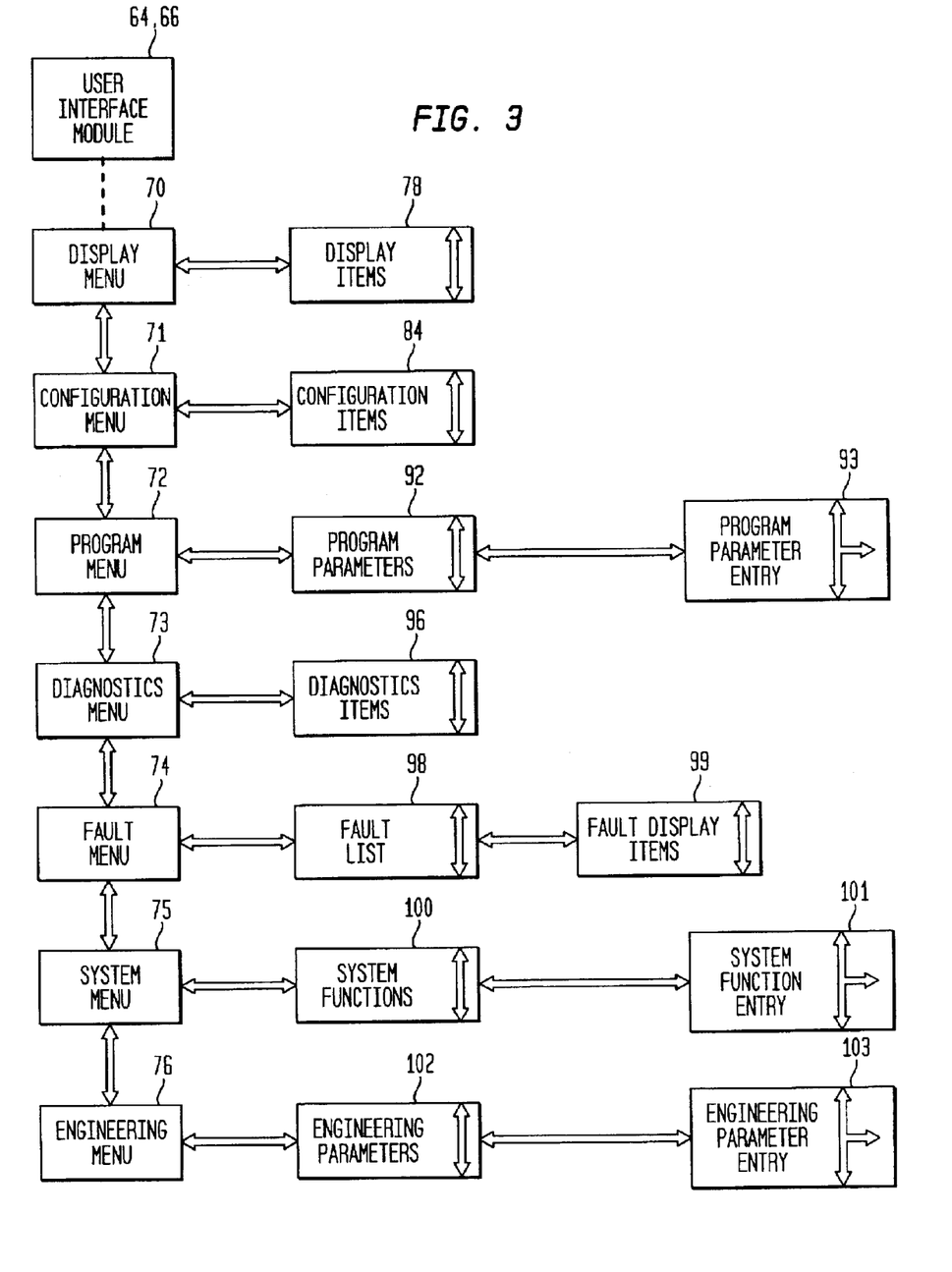
FIG. 3 is a flow diagram illustrating a configuration module implemented by the motor controller system of FIG. 2.

With reference to FIG. 3, a flow diagram illustrates operation of the configuration module 64. As discussed above, operating parameters and values are stored in the motor controller memory 38. The software for configuring these parameters resides generally in the motor controller configuration module 64. Portions of the software relating to the user interface reside in both the motor controller memory 38 and the external device processor and memory 56. How the software illustrated in FIGS. 3–11 is divided between the modules 64 and 66 may be determined according to memory requirements and the like to provide efficient communications on the communication path 63.

The configuration module software, as shown in FIG. 3, uses a menu hierarchy. Initially, the user can scroll using up and down switches locally or remotely to select among the different menus including a display menu 70, a configuration menu 71, a program menu 72, a diagnostics menu 73, a fault menu 74, a system menu 75, and an engineering menu 76. From any of these menus 70–76, the user can use left and right switches of the local or remote user interface to select the particular menu.

Figure 4:
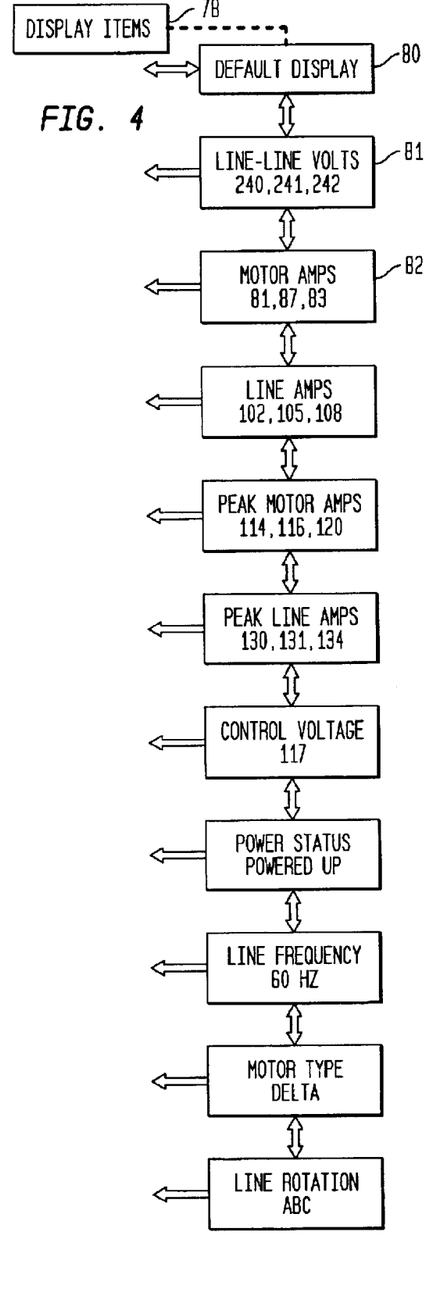
FIGS. 4–11 are individual flow diagrams illustrating user interface menu operations implemented by the configuration module of FIG. 3.
Figure 5:
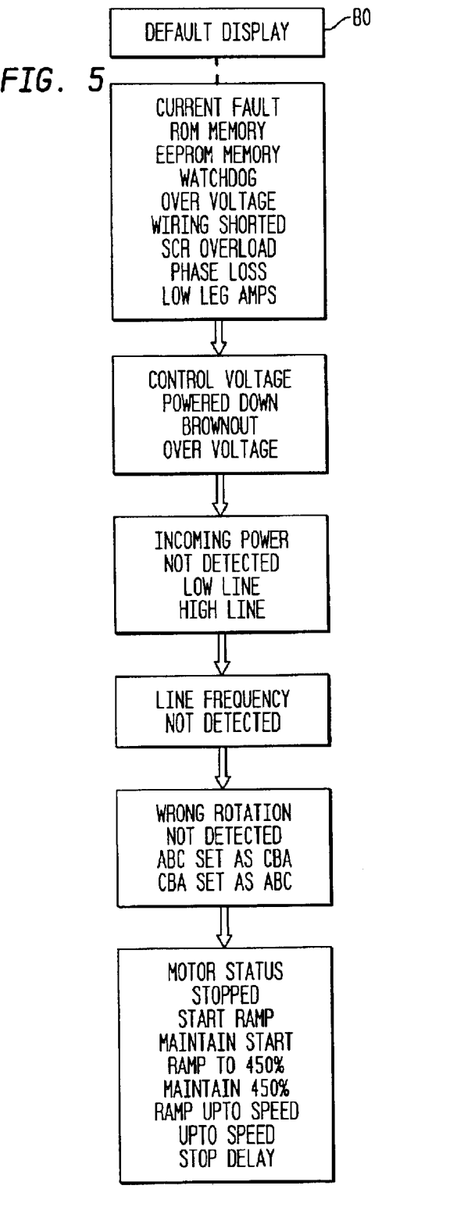

For example, if the display menu 70 is selected, then the user can access a display items routine 78 using a right arrow key. The display items routine is shown in FIG. 4. The display items routine initially shows a default display 80. The default display, shown in FIG. 5, comprises a series of displays the user can scroll through to provide status information for operation of the motor controller 20. From the default display 80, the user can use the up and down keys, as shown by up and down arrows in FIG. 4, to scroll and view specific operating values. For example, a block 81 illustrates operating values for line to line voltages between the phases. A block 82 illustrates motor current for each phase. For many of these blocks, the left and right arrow keys can be used to return to the display menu 70, see FIG. 3. The display items block includes other operating values shown in FIG. 4 and not described in detail herein.

Figure 6:
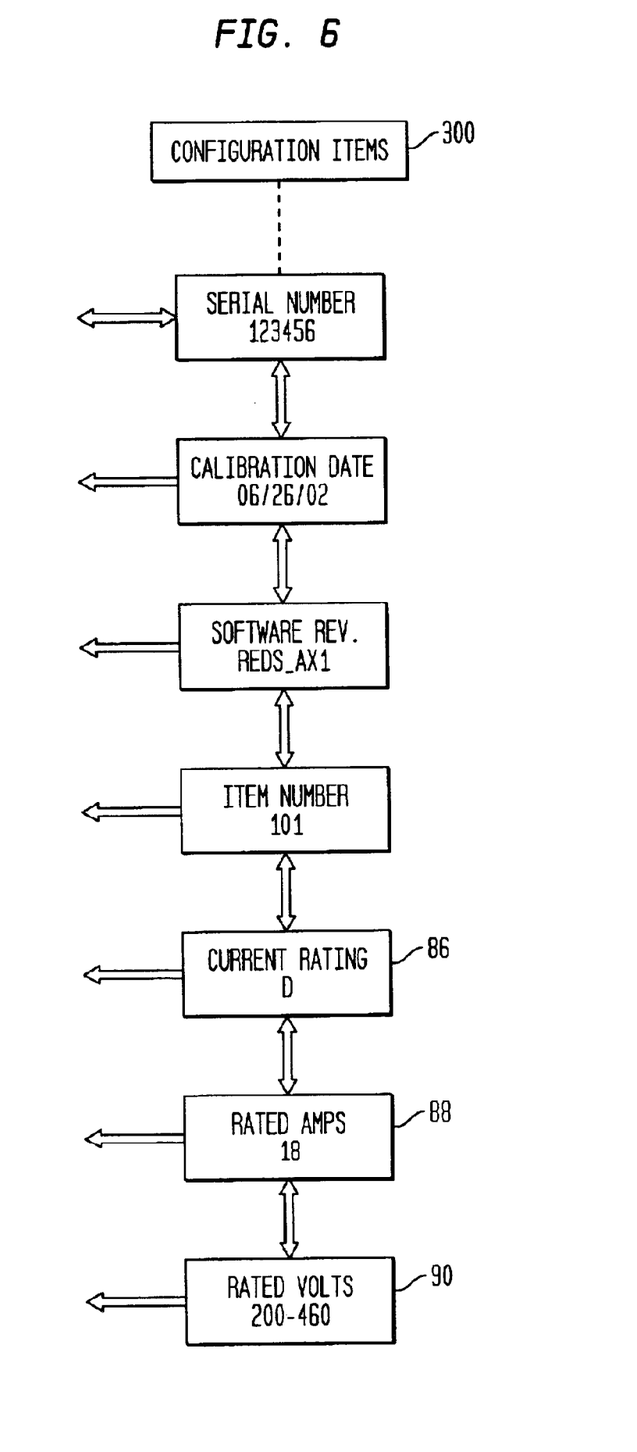

If the user selects the configuration menu 71, see FIG. 3, then the program moves to the configuration items routine 84. The configuration items routine 84 is illustrated in FIG. 6. The configuration items routine is used to display operating parameters for the motor controller 20 and a motor controlled thereby. For example, among the configuration items are a current rating value 86, a rated amps value 88 and rated voltage value 90. These are used to view various operating values for the particular motor being controlled. These values are used during motor operation.

Figure 7:
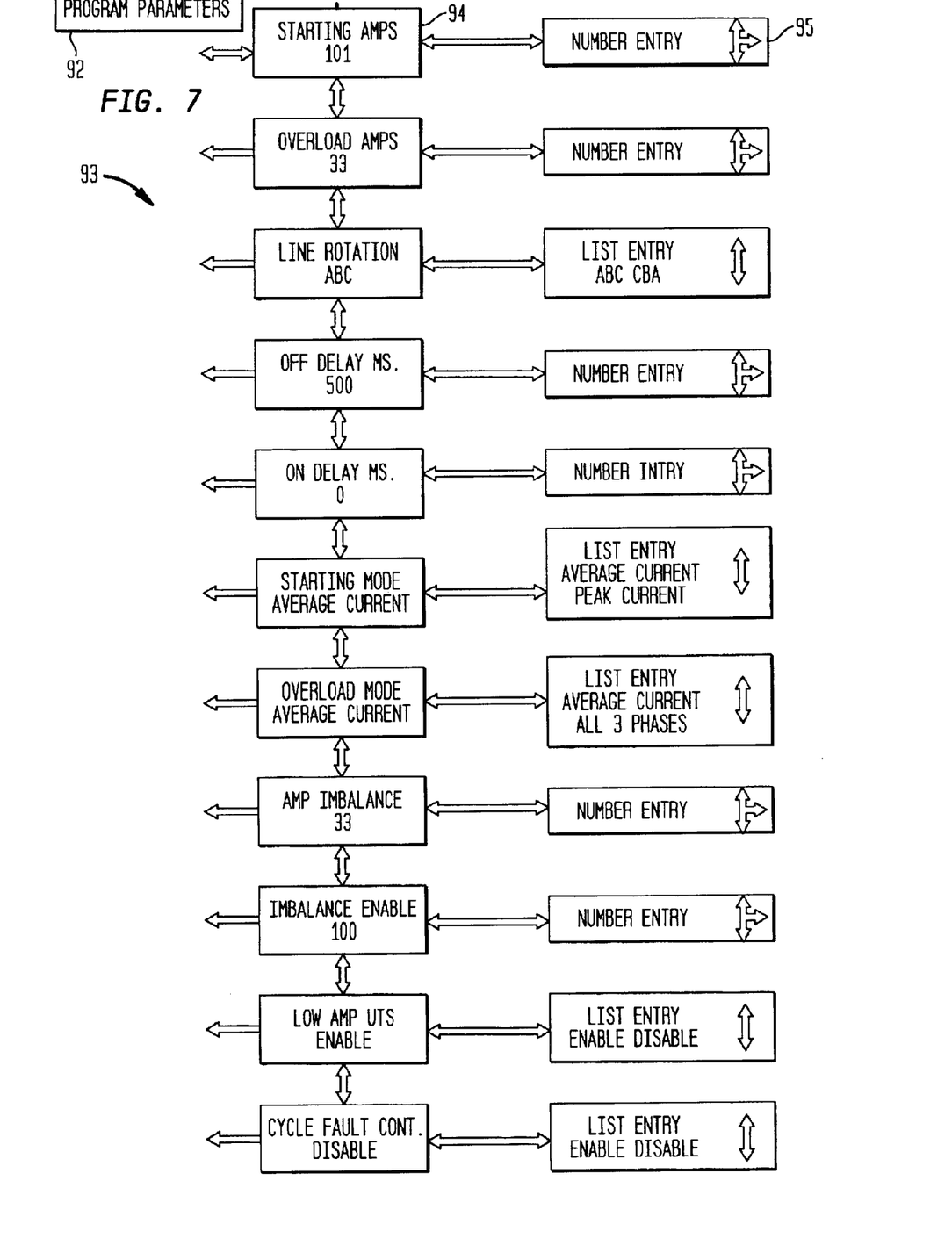

When the user selects the program menu 72, the program parameters routine 92 is initiated. When the program parameters routine 92 is initiated, program parameter entries can be made in the block 93. The program parameters block 92 is illustrated in FIG. 7 listing various program parameters in the left column that can be changed and a right column 93 illustrating how program parameter entry is accomplished.

As above, the user can scroll through the list of configurable program parameters using the up and down keys. From this menu, the left arrow key can be used to return to the main menu of FIG. 3. The right arrow key can be used to select program parameter entry in the column 93 for the selected program parameter. Starting at a block 94, the starting current limit can be selected using the right arrow key to the block 95 that provides for a number entry. The starting current limit is adjustable either in amps in the range of 115% to 425% on a standard unit or on a percentage of the overload setting from 150% to 450%. The user can adjust to any value within the range. As is apparent, other ranges could also be used.

The overload amps block 110 can be selected to select any value at a block 111 within a range for setting an overload current value. A line rotation block 112 can be selected to provide a list entry at a block 113 for selecting among discrete options for line rotation. The line rotation selection allows the user to select the rotation sequence of the incoming power. An off delay menu block 114 enables the user to select any value in the range of, for example, 0 to 5 seconds at a block 115. The motor will continue to run while the off delay is timing. An on delay menu block 116 allows the user to select any value within the range of, for example, 0 to 5 seconds at a block 117 to set the time that the processor 36 waits after receiving a run signal before actually starting the motor.

A starting mode menu block 118 enables the user to select from a discrete list entry of whether the starting mode would be based on, for example, average current or peak current at the block 119. An overload mode menu block 120 allows the user to select an overload mode using a discrete list entry at a block 121 including, for example, average current or all three phases.

A current imbalance menu block 122 allows the user to select at a block 123 any trip level in the range of, for example, from 0.1 to 0.75. The level is derived by dividing RMS value of current in a winding with the lowest current by the RMS value of the current through the winding with the highest current to determine if an imbalance is present. An imbalance enable menu block 124 uses a number entry at a block 125 to select any level at which a current imbalance fault is disabled. Current imbalance faults may be disabled when the currents are less than the product of the selected value and the equivalent of the overload setting.

A low amps UTS menu block 126 provides list entry for enabling or disabling at a block 127. A cycle fault control menu block 128 provides a list entry at block 129 for enabling or disabling.

Figure 7A:
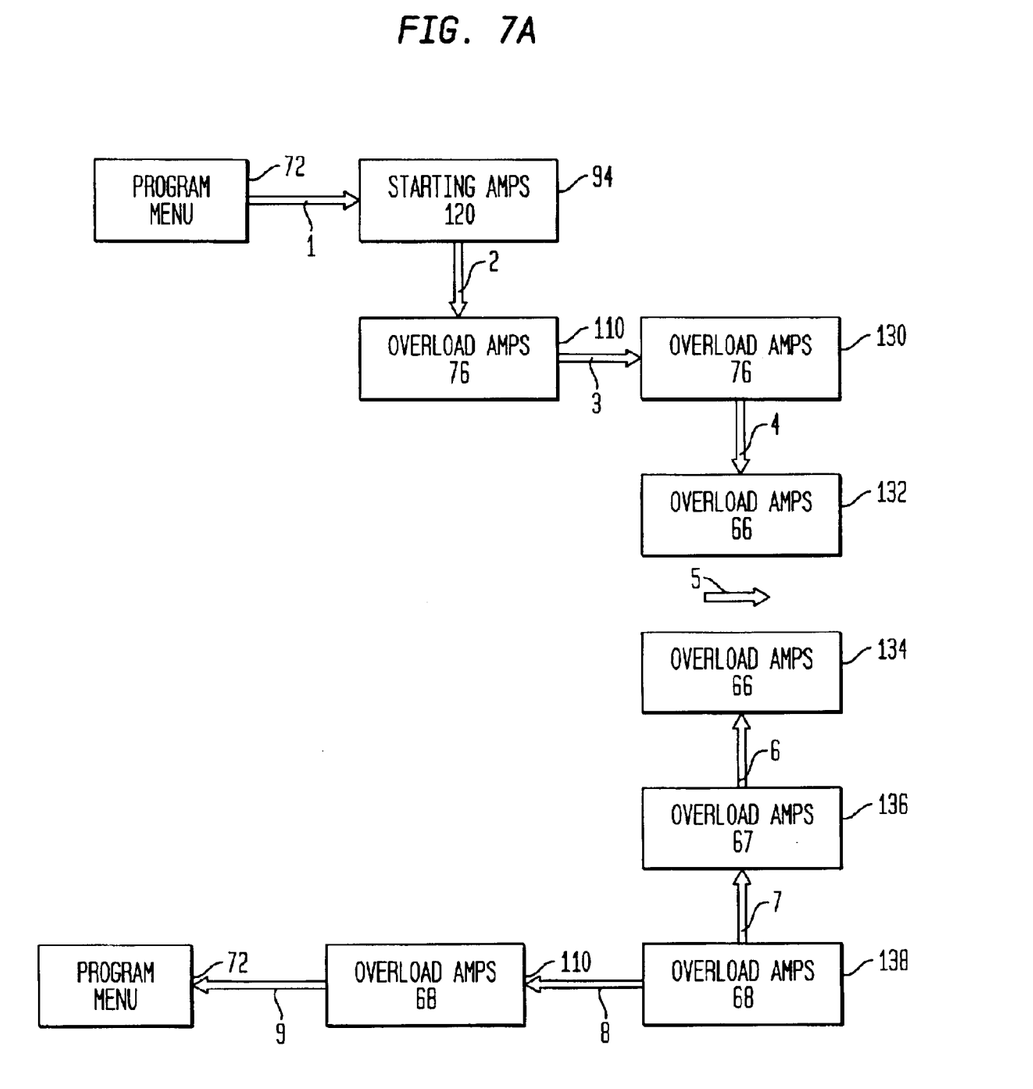

Referring to FIG. 7A a numerical entry example for configuring overload amps is illustrated. As is apparent, this example can be applied to other settings for number entry. In this example the user begins at the program menu block 72 and first depresses a right arrow key to transition to the program parameters block 92 and particularly the starting amps block 94. The down arrow key is next pressed to highlight the overload amps block 110. The right arrow key is then depressed to begin number entry at a block 130. In the entry mode the left most digit starts flashing, as in indicated by the enlarged character. Fourth, the down key decrements the left most digit as illustrated in block 132. In the fifth step the right arrow key moves the flashing digit one digit to the right at a block 134. In a sixth step the up key increments the ones digit as shown at a block 136. At a seventh step the up key again increments the ones digit at a block 138. In an eighth step the left arrow saves the new overload amps value at the block 110 and the left arrow key in a ninth step returns to the main program menu 72.

As described above, the user can update stored configuration information consisting of either discrete values or lists or an adjustable value within a range. Either the local user interface or remote interface is used to select any adjustable value within the identified ranges. Thus, continuously variable settings are available to any value between the upper and lower limits of the range.

Figure 8:
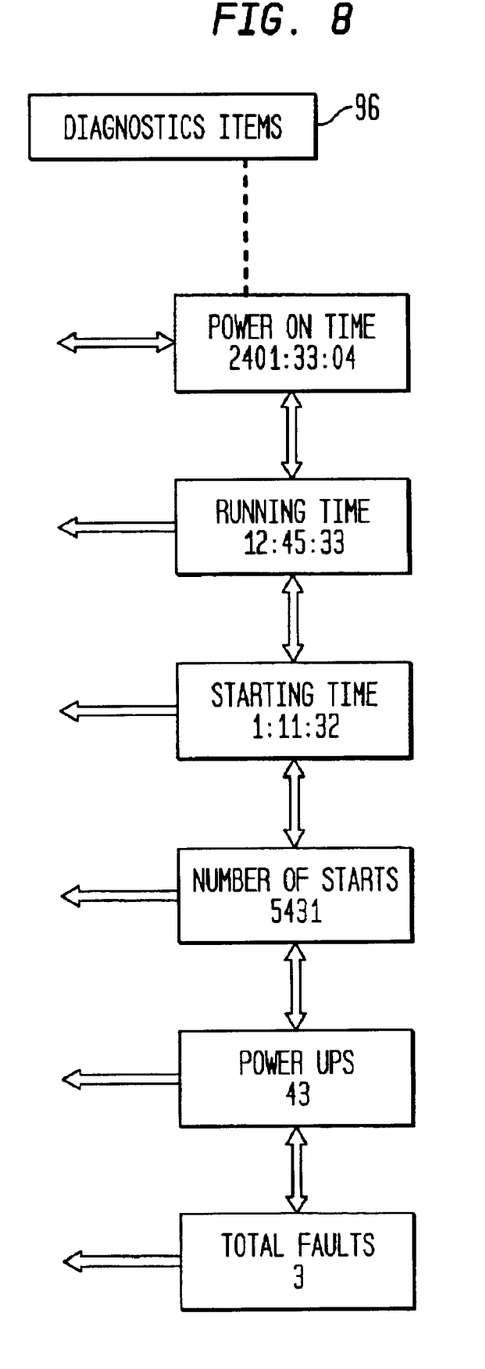

When the user selects the diagnostics menu 73, see FIG. 3, a diagnostics item routine 96 is implemented. The diagnostics items routine 96 is illustrated in FIG. 8. This routine is used to display diagnostic information including:
POWER ON TIME
RUNNING TIME
STARTING TIME
NUMBER OF STARTS

POWER UPS

TOTAL FAULTS

Figure 9:
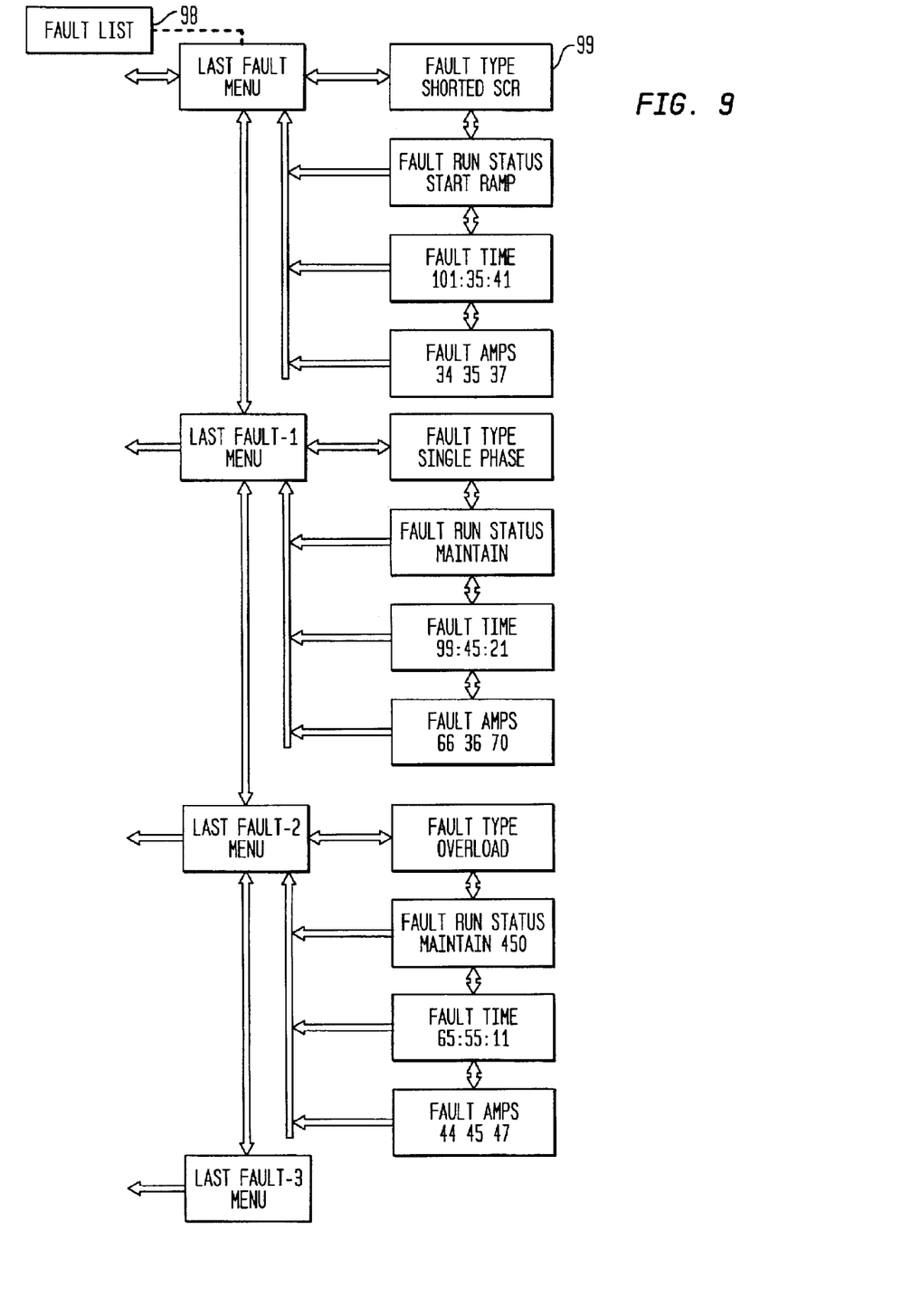

If the user selects the fault menu 74, see FIG. 3, the program moves to a fault list routine 98 which includes a fault display item routine 99. The fault list routine 98 is shown in FIG. 9 and includes the right most column showing the fault display items 99. As is apparent, the fault list shows specific information relating to faults sensed by the motor controller 20.

Figure 10:
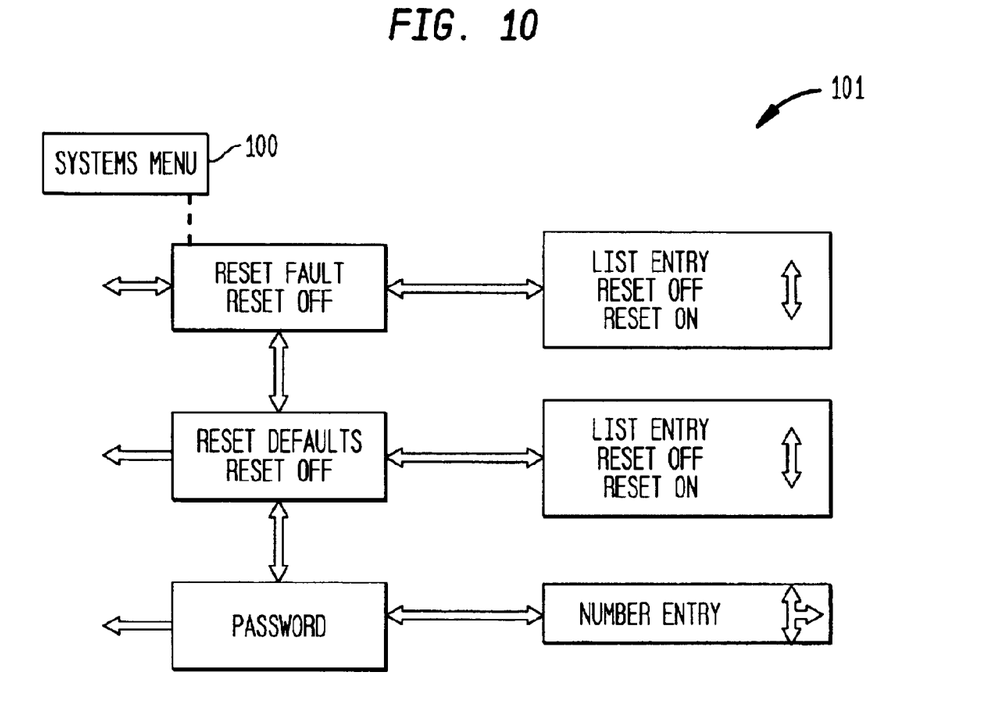

If the system menu routine 75, see FIG. 3, is selected, then a system functions routine 100 and related system function entry 101 are selected. The systems function routine is illustrated in FIG. 10 along with the right most column showing system function entry 101. The systems function routine 100 is used for resetting faults, default values, and password entry.

Figure 11:
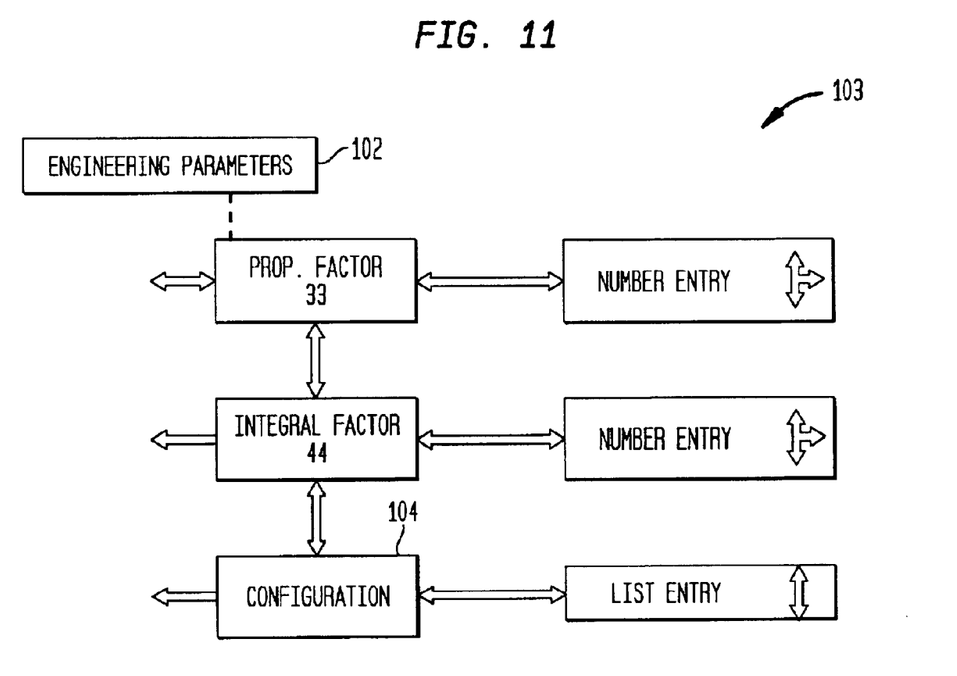

Finally, if an engineering menu routine menu 76, see FIG. 3, is selected, then an engineering parameter routine 102 is entered which includes engineering parameter entry 103. The engineering parameters routine 102 is illustrated in FIG. 11 along with the right most column illustrating the engineering parameter entry 103. The engineering parameters are used to configure proportional and integral factors for controller motor operation along with selecting configuration for particular type devices operated by the motor controller 20. For example, the motor controller 20 may be used as an elevator starter. The configuration block 104 may be used to select among standard configurations provided for particular elevator manufacturers.

Thus, the end user has an improved user interface both in the form of a local interface and a remote interface. The user can change virtually any control parameters and with more precision. Particularly, any parameter variable within a range can use any value in the range.

It can therefore be appreciated that a new and novel system and method for configuring motor controller settings has been described. It will be appreciated by those skilled in the art that, given the teaching herein, numerous alternatives and equivalents will be seen to exist which incorporate the disclosed invention. As a result, the invention is not to be limited by the foregoing exemplary embodiments, but only by the following claims.

We claim:

1. A method of configuring a motor controller, comprising:
providing the motor controller to include solid state switches for connection between an AC line and motor terminals for controlling application of AC power to the motor, and a control circuit for controlling operation of the solid state switches, the control circuit comprising a programmed processor for commanding operation of the solid state switches, and a memory connected to the programmed processor storing configuration information relating to operation of the solid state switches;
providing a user configuration device for selecting values for the stored configuration information, the configuration information consisting of either discrete values or adjustable values within a range, the configuration device being adapted to select any adjustable value within the range; and
using the configuration device to update the stored configuration information using the selected parameters.

2. The method of configuring a motor controller of claim 1 wherein the adjustable values are selected from starting current limit, overload current, on delay, off delay, current imbalance trip level, and current imbalance disable level.

3. The method of configuring a motor controller of claim 1 wherein providing a configuration device comprises providing a remote configuration device using a wireless interface.

4. The method of configuring a motor controller of claim 1 wherein providing a configuration device comprises providing a keypad connected to the programmed processor.

5. The method of configuring a motor controller of claim 1 wherein selecting any adjustable value within the range comprises selecting any value between an upper limit and a lower limit.

6. The method of configuring a motor controller of claim 1 wherein the user configuration device enables a user to configure starting current limit, overload current, line rotation, off delay, on delay, average or individual winding overload protection, current imbalance trip level, and current imbalance disable level.

7. A configurable motor controller, comprising:
solid state switches for connection between an AC line and motor terminals for controlling application of AC power to the motor;
a control circuit for controlling operation of the solid state switches, the control circuit comprising a programmed processor for commanding operation of the solid state switches, and a memory connected to the programmed processor storing configuration information relating to operation of the solid state switches; and
a user configuration device for selecting values for the stored configuration information, the configuration information comprising adjustable values within a range, the configuration device being adapted to select any adjustable value within the range.

8. The configurable motor controller of claim 7 further comprising a wireless communication module operatively connected to the programmed processor and the user device communicates with the programmed processor using the wireless communication module.

9. The configurable motor controller of claim 7 wherein the user configuration device comprises a keypad and display operatively connected to the programmed processor for selecting parameters for the stored configuration information.

10. The configurable motor controller of claim 7 wherein the adjustable values are selected from starting current limit, overload current, on delay, off delay, current imbalance trip level, and current imbalance disable level.

11. The configurable motor controller of claim 7 wherein the user configuration device selecting any adjustable value within the range comprises selecting any value between an upper limit and a lower limit.

12. The configurable motor controller of claim 7 wherein the user configuration device provides a user to configure starting current limit, overload current, line rotation, off delay, on delay, average or individual winding overload protection, current imbalance trip level, and current imbalance disable level.

13. A configurable motor controller, comprising:
a housing;
solid state switches in the housing for connection between an AC line and motor terminals for controlling application of AC power to the motor;
a control circuit in the housing for controlling operation of the solid state switches, the control circuit comprising a programmed processor for commanding operation of the solid state switches, and a memory connected to the programmed processor storing configuration information relating to operation of the solid state switches;
a user configuration device for selecting values for the stored configuration information, the configuration information consisting of discrete values and adjustable values within a range, the configuration device being adapted to select any adjustable value within the range.

14. The configurable motor controller of claim 13 further comprising a wireless communication module operatively connected to the programmed processor and the user device communicates with the programmed processor using the wireless communication module.

15. The configurable motor controller of claim 13 wherein the user configuration device comprises a keypad and display operatively connected to the programmed processor for selecting parameters for the stored configuration information.

16. The configurable motor controller of claim 13 wherein the adjustable values are selected from starting current limit, overload current, on delay, off delay, current imbalance trip level, and current imbalance disable level.

17. The configurable motor controller of claim 13 wherein the user configuration device selecting any adjustable value within the range comprises selecting any value between an upper limit and a lower limit.

18. The configurable motor controller of claim 13 wherein the user configuration device provides a user to configure starting current limit, overload current, line rotation, off delay, on delay, average or individual winding overload protection, current imbalance trip level, and current imbalance disable level.

19. A system for configuring starter settings comprising:
a plurality of solid state switch means for connection between an AC line and motor terminals for controlling application of AC power to the motor;
control circuit means for controlling operation of the solid state switches, the control circuit means comprising processor means for commanding operation of the solid state switch means, and memory means storing configuration information relating to operation of the solid state switch means;
user configuration means for selecting values for the stored configuration information, the configuration information consisting of either discrete values or adjustable values within a range, the configuration means being adapted to select any adjustable value within the range.

20. The system of claim 19 wherein the adjustable values are selected from starting current limit, overload current, on delay, off delay, current imbalance trip level, and current imbalance disable level.

21. The system of claim 19 wherein the user configuration means comprises a remote configuration device using a wireless interface.

22. The system of claim 19 wherein the user configuration means comprises a keypad connected to the programmed processor.

23. The system of claim 19 wherein the user configuration means enables a user to configure starting current limit, overload current, line rotation, off delay, on delay, average or individual winding overload protection, current imbalance trip level, and current imbalance disable level.

* * * * *